United States Patent [19]

Grady

[11] Patent Number: 5,126,096
[45] Date of Patent: Jun. 30, 1992

[54] METHOD AND APPARATUS FOR PRODUCING POLYMERIC FILMS

[75] Inventor: Clyde C. Grady, Baytown, Tex.

[73] Assignee: Exxon Chemical Patents Inc., Linden, N.J.

[21] Appl. No.: 724,607

[22] Filed: Jul. 2, 1991

Related U.S. Application Data

[63] Continuation of Ser. No. 486,707, Feb. 28, 1990, abandoned.

[51] Int. Cl.$^5$ .............................................. B29C 47/88
[52] U.S. Cl. ..................................... 264/566; 264/569; 425/72.1; 425/326.1
[58] Field of Search .................. 264/566–569, 264/564; 425/326.1, 72.1, 387.1

[56] References Cited

U.S. PATENT DOCUMENTS

| 3,754,067 | 8/1973 | St. Eve et al. | 264/89 |
| 3,764,251 | 10/1973 | Konerman | 425/326 |
| 3,888,609 | 6/1975 | St. Eve et al. | 425/72.1 |
| 3,956,254 | 5/1976 | St. Eve et al. | 526/352 |
| 4,330,501 | 5/1982 | Jones et al. | 264/566 |
| 4,447,387 | 5/1984 | Blakeslee et al. | 264/566 |
| 4,472,343 | 9/1984 | Kawamura et al. | 264/565 |
| 4,473,527 | 9/1984 | Fujisaki et al. | 264/566 |
| 4,479,766 | 10/1984 | Planeta | 425/72.1 |
| 4,606,879 | 8/1986 | Cerisano | 264/565 |

FOREIGN PATENT DOCUMENTS

| 53-146764 | 12/1978 | Japan | 264/569 |
| 58-119823 | 7/1983 | Japan | 264/569 |

Primary Examiner—Jeffery Thurlow
Attorney, Agent, or Firm—R. W. Mulcahy

[57] ABSTRACT

An apparatus and method for the production of polymeric films by a blown film process is disclosed. Polymeric films produced from crystallizable linear polymers are extruded through a die extruder, expanded by the injection of a gas inside the tubular film, cooled at the point of extrusion from the die, and further cooled at the point of maximal expansion or the frost line to produce a film having substantially enhanced optical characteristics.

9 Claims, 2 Drawing Sheets

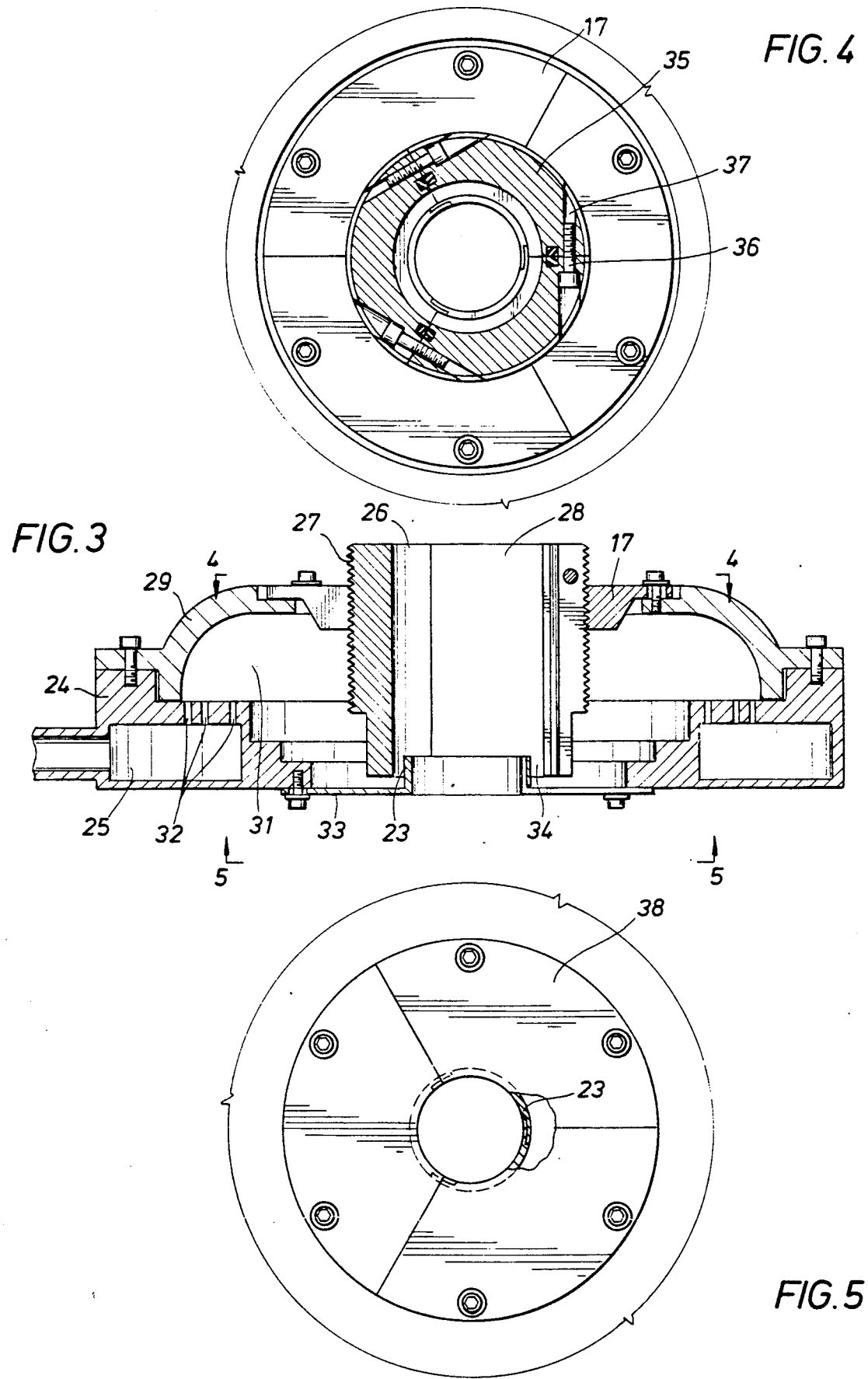

METHOD AND APPARATUS FOR PRODUCING POLYMERIC FILMS

This is a continuation of Ser. No. 07/486,707, filed on 2/28/90, now abandoned.

FIELD OF THE INVENTION

The present invention relates to a process and apparatus for producing polymeric films by the blown-tube method. More particularly, this invention relates to a method and apparatus for producing polymeric films having enhanced optical characteristics.

DESCRIPTION OF THE PRIOR ART

Polymeric films have been produced previously by the blown extrusion method. According to this method, a polymeric resin is melted by a screw extruder and caused to pass through a die having a circular orifice thereby forming a tubular film. A gas, usually air, is provided by an inlet to the interior of the tubular film as it exits the die to inflate a bubble of the film to a desired diameter. The gas is contained within the bubble by the die at one end and nip rolls at the opposite end which provide the force to pull the bubble away from the die. The rate of extrusion of the molten resin, the rate of speed of the nip rolls, and the degree of inflation of the bubble are factors which determine the final thickness of the film.

Between the die and the nip rolls, the molten bubble is expanded to a maximum diameter, is externally cooled, and undergoes a phase change to form a solid film. The point of phase change is generally termed a "frost line". In crystalline or semi-crystalline polymers a "frost line" is observed at the point of maximal expansion as the molten resin becomes crystalline and normally becomes hazy. The tubular film is generally cooled as it exits the die by air which is applied to the film by means of an external air ring.

Prior modifications of the general method have included the use of a second external air ring to cool the film near its exit from the die and to provide for a faster rate of resin extrusion. U.S. Pat. No. 4,330,501 discloses an apparatus having an air ring system comprising two or more stacked air rings extending from the die to a distance below the frost line. This air ring system provides two or more sources of cooling gaseous medium, all of which exit the system through a common plate formed by the last cooling ring. In a similar manner, U.S. Pat. Nos. 3,956,254; 3,888,609 and 3,754,067 each disclose a double air ring system in which a vacuum is used in an annealing chamber to effect cooling of the extruded melt. U.S. Pat. No. 4,479,766 discloses a method by which a second cooling air ring is mounted upon a sliding chamber for longitudinal movement along the blown tube, permitting movement of the air ring and the vacuum created by it, along the molten material as it is extruded.

European Patent Application 85/101,994.3 discloses a double air ring system which provides a second air ring positioned at the point where the bubble begins to expand. This method was found to be useful for controlling the expansion of the bubble, however it was found not to be effective with linear low density polyethylene and other types of ethylene-olefin copolymers.

While the above-mentioned air ring system modifications have provided a faster through-put, these methods do not substantially improve the optical properties of the resultant film, namely haze and gloss. Therefore, there is a need for an improved process and apparatus for the production of polymeric films which results in film with improved optical characteristics, including less haze and more gloss, and which would be inexpensive, easy to perform, and would be useful for a wide range of crystalline and semi-crystalline polymers, such as polyvinyl chloride, polypropylene and polyethylene films, including linear low density polyethylene and high density polyethylene.

SUMMARY OF THE INVENTION

The present invention is directed to a method and apparatus for producing polymeric films by a blown-tube process which produces polymeric films having substantially improved optical characteristics, i.e., reduced haze and increased gloss, while retaining strength characteristics of the film.

The apparatus includes a means for introducing a molten, film-forming, thermoplastic resinous material into an annular die for extrusion through the die to generate a tubular film. Means are also provided for maintaining a positive gas pressure in the interior of the tubular film to expand the film in a direction generally normal to the longitudinal axis of the tubular film. To cool the tubular film as it exits the die extruder, the apparatus includes a first air ring positioned about the tubular film proximate to and coaxial with the die and the tubular film. This first air ring delivers a stream of cooling gaseous medium to the exterior of the film in a direction substantially parallel to the longitudinal axis of the tubular film. Furthermore, to improve the stability of the bubble, as well as to improve the optical characteristics of the film, the apparatus includes a second air ring positioned about the tubular film coaxial with the die and the first air ring. The second air ring serves to deliver a stream of cooling gaseous medium to the exterior of the tubular film at approximately the point of its maximal expansion (the frost line) in a direction which is substantially parallel to the longitudinal axis of the tubular film. Also, the second air ring incorporates a specially designed vertical lip which helps to shear the gaseous medium dispensed from the first air ring away from the film and the lip at the second air ring.

The method includes heating an extrudable, film-forming thermoplastic resinous material to a molten condition, and extruding the molten resin through an annular die to form a tubular film. A gas is injected into the interior of the tubular film for expansion in a direction substantially normal to its longitudinal axis to maintain a positive gas pressure within the tubular film. A first stream of gaseous medium is delivered to cool the tubular film at the point of its extrusion from the die. A second stream of gaseous medium is delivered at the point of maximal expansion of the tubular film to cool the tubular film and to improve the optical characteristics of the film. Nucleating agents such as di-(p-tolylidene)sorbitol (C.A.S. 54686-97-4) may be added to the resin prior to its extrusion to further increase the clarity of the film product.

Examples of the more important features of this invention have been summarized rather broadly in order that the detailed description which follows may be better understood. There are, of course, additional features of the invention which will be described hereafter and which will also form the subject of the claims appended hereto.

BRIEF DESCRIPTION OF THE DRAWINGS

In order to more fully understand the drawings referred to in the detailed description of the present invention, a brief description of each drawing is provided.

FIG. 3 is a cross-sectional elevation view of a portion of the present invention.

FIG. 4 is a cross-sectional view taken along line 4—4 of FIG. 3.

FIG. 5 is a plan view taken along line 5—5 of FIG. 3.

DETAILED DESCRIPTION OF THE INVENTION

Figure 1:
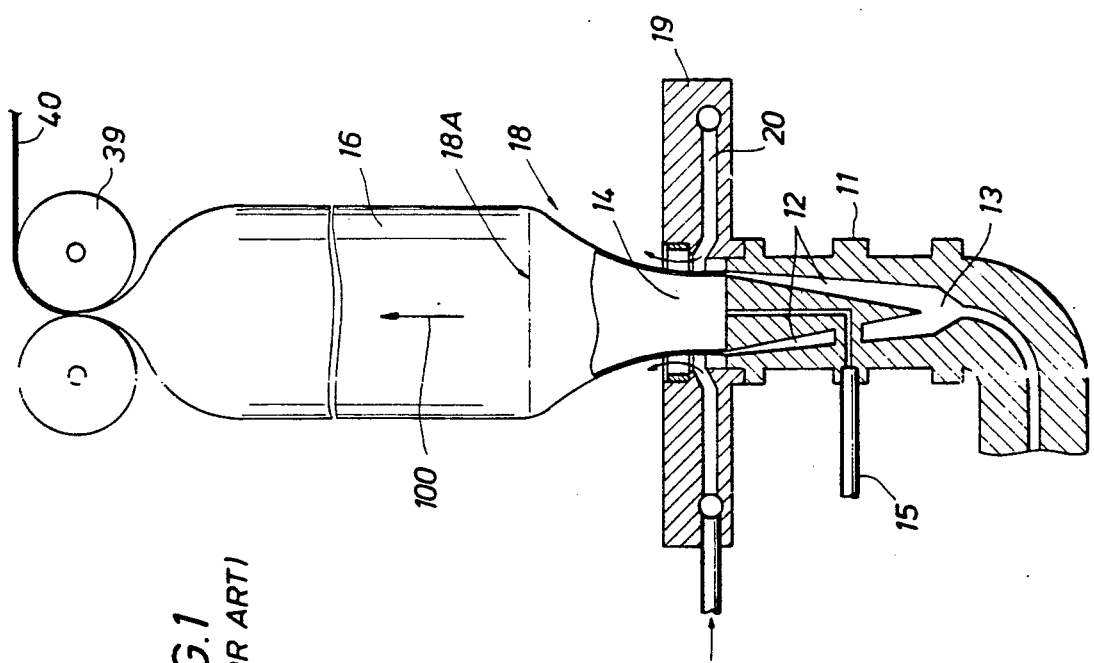
FIG. 1 is an elevation view, partially in cross-section, of a prior art blown film extrusion apparatus.

Referring to FIG. 1, a polymeric resin is melted and passed through a screw extruder die 11 having a circular orifice 12 which forms a molten tubular film bubble 14. A gas, usually air, is injected into the interior of the tubular film through an inlet 15 as it exits the die 11. The injected gas is used to inflate the bubble 14 of the film to a desired diameter. The gas is contained within the bubble 14 by the die 11 at one end and nip rolls 39 at the opposite end which provide the force to pull the bubble away from the die.

Between the die 11 and the nip rolls 39, the molten bubble 14 is expanded to a maximum diameter and externally cooled. The tubular film 14 is generally cooled as it exits the die 11 by means of an external air ring 19. As it cools, the polymer ultimately undergoes a phase change to form a solid film. In crystalline or semi-crystalline polymers, a "frost line" (phantom line 18) is normally observed at the point of maximal expansion 18A as the molten resin undergoes the phase change becomes solid. The term "frost line" refers to the fact that films produced from crystalline or semi-crystalline polymers take on a "frosted" or hazy character as the molten resin solidifies. After the solidification of the molten tubular film 14 to form the solid film tube 16, the solid film tube 16 is collapsed by nip rolls 39 to form the collapsed film bubble 40.

Figure 2:
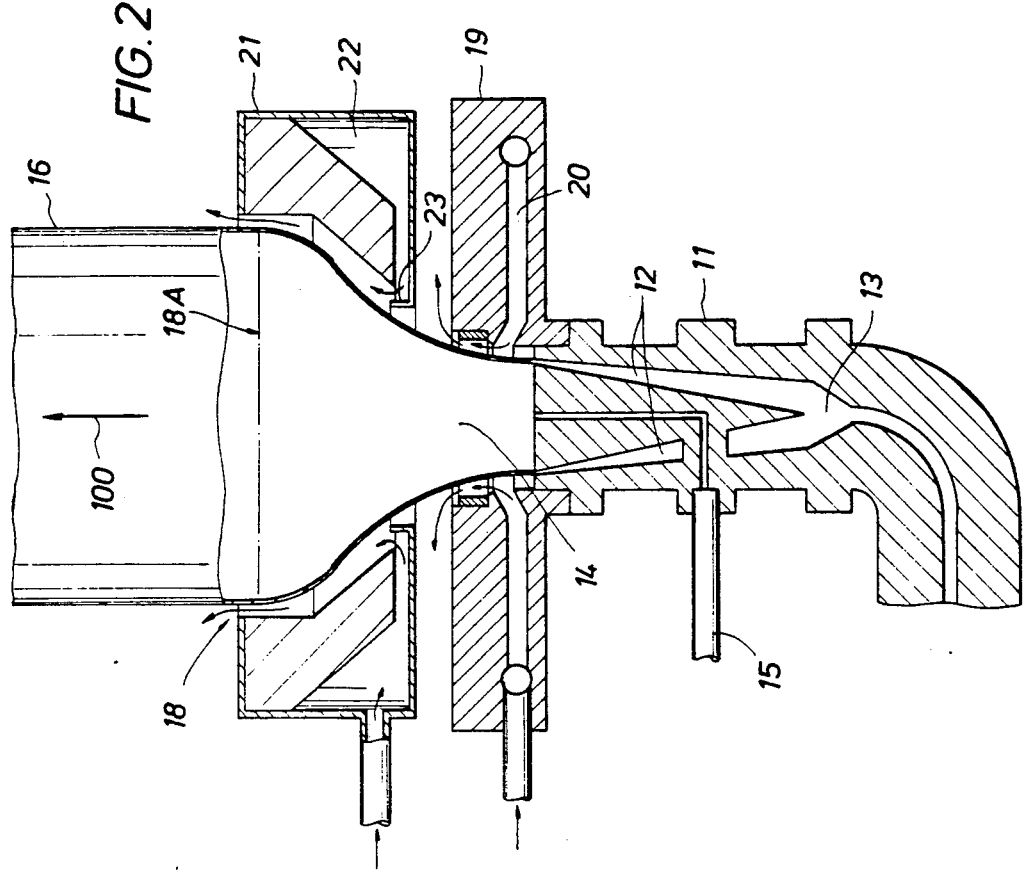
FIG. 2 is an elevation view, partially in cross-section, of the blown film extrusion apparatus of the present invention.

Referring now to FIG. 2, a blown-tube apparatus is illustrated having an extruder die with an annular orifice 12. A conduit 13 in the extruder die 11 delivers a molten resinous material to the annular orifice 12 for extrusion therethrough to form a tubular film 14. An inlet 15 supplies a gas, usually air to the inside of the tubular film 14. The molten tubular film 14 initially comprises a substantially uniform diameter equal to that of the annular orifice 12 which extends therefrom. The expanded diameter of the solid film bubble 16 may be several times that of the molten film bubble stalk 14. The ratio of expanded solid film diameter to the molten tubular diameter, commonly referred to as the "blow-up ratio," is generally in the range of 1.5 to 6.0. The direction of the extrusion of the bubble 17 away from the die 11 is represented in FIG. 2 in the vertical direction by arrow 100. While it is common that the extrusion process occurs in the vertical direction, it is not critical.

In the case of crystalline or semicrystalline polymers, a visible line, represented in FIG. 2 by phantom line 18, is located downstream from the annular orifice 12 at the point of the maximal expansion 18A of the bubble 17 and is again referred to as the "frost line". This is the point at which the molten resin solidifies to form a solid thermoplastic material.

Still referring to FIG. 2, a first air ring 19 is positioned about the tubular film 14 proximate to the die 11 and coaxial with the die 11 and the tubular film 14. The first air ring 19 contains an annular chamber 20 for the delivery of a gaseous medium to the exterior of the tubular film 14 at the point of its extrusion from the annular orifice 12. Preferably, the internal diameter of the first air ring 19 is approximately the same as the diameter of the annular orifice 12 of the die 11.

A second air ring 21 is positioned about the tubular film 14 coaxial with the die 11 and the first air ring 19 and downstream (or above air ring 19 in FIG. 2) from the first air ring at approximately the point of maximal expansion 18A of the tubular film. The second air ring contains an annular chamber 22 for the delivery of a gaseous medium to the exterior of the tubular film 14 at the point of its maximal expansion. The internal diameter of the second air ring 21 is approximately the same as the desired maximum expansion.

The second air ring 21 preferably contains a vertical lip 23 proximate to and parallel with the tubular film 14 to direct the delivery of a cooling gaseous medium in a direction parallel to the longitudinal axis of the tubular film 14. The vertical lip 23 is also designed to help shear the gaseous medium dispensed by the first air ring 19 away from the tubular film 14.

Referring now to FIG. 3, the second air ring 21 is further illustrated having a base member 24 with a first annular chamber 25 adapted to receive a gaseous medium. A sleeve 26, having an outside surface 27 and an inside surface 28 is supported above the base member 24 by a collar 29 and support ring 17 attached thereto. The inside surface 28 is proximate the outside surface of the tubular film 14. The ring 17 by its attachment to the outside surface 27 of the sleeve 26, the collar 29, to the top of the base member 24 forms a second annular chamber 31. A plurality of ports 32 in the base member 24 are adapted to promote gaseous communication between the first annular chamber 25 and second annular chamber 31. Accordingly, annular chamber 25, ports 32 and annular chamber 31 form the annular chamber 22 shown in FIG. 2. Still referring to FIG. 3, an annular disc 33 mounted on the bottom of the base member 24 contains a vertical lip 23 which projects toward the sleeve 26 in a direction substantially parallel with the longitudinal axis of the sleeve 26. The orientation of the vertical lip defines an open annulus 34 between the vertical lip 23 and the inside surface 28 of the sleeve 26.

The outside surface 27 may in threaded communication with the ring 17. Alternatively, the ring 17 may contain a clamp or other means for attaching to the sleeve 26, but allowing for removal and replacement of the sleeve 26 at the appropriate time. Thus, the sleeve 26 may be replaced without having to remove the air ring. This permits on-line changing of the blow-up ratio without loss of a bubble in process.

Referring to FIGS. 4 and 5, additional features of the second air ring 21 are illustrated. The sleeve 26 may include a plurality of interlocking plates 35 which are held together by screws 36. Each screw 36 may be positioned in a shaft 37 and disposed in a plane tangential to the longitudinal axis of the sleeve 26. Similarly, the annular disc 33 may be comprised of a plurality of interlocking plates 38.

Referring back to FIG. 2 in the operation of the present invention, an extrudable, film-forming thermoplastic resin is delivered to an extruder where it is heated to a molten condition. The molten resin is then passed under pressure through the conduit 13 to the annular orifice 12 of the die extruder 11. The heated resinous material is extruded through the annular orifice 12, to form a tubular film 14. A gas, usually air, is delivered to the interior of the tubular film 14 through an inlet 15 to expand the tubular film substantially normal to its longitudinal axis, and to maintain a positive gas pressure within the tubular film 14. A first stream of gaseous medium, usually a gas such as air, is delivered through a first air ring 19 to the tubular film 14 at the point of its extrusion from the annular orifice 12 of the die extruder 11. A second stream of gaseous medium, again a gas such as air, is delivered through a second air ring 21 to the tubular film 14 at the point of maximal expansion 18A. The tubular film is pulled through a collapsing frame by nip rollers 39 (see FIG. 1) which flatten the bubble to a film.

The tubular film 14 is established on the first air ring 19 but as the flow of the gaseous medium, e.g., air, to the first air ring 19 is increased, the frost line 18 is lowered to below the second air ring 21. Air flow to the second air ring 21 is then introduced and set at a pre-determined rate. The flow of air to the first air ring 19 is then decreased, or alternatively the temperature of the air flowing from the first air ring is increased raising the frost line 18 toward the second air ring 21, at which time the film acquires substantially enhanced optical qualities including decreased haze and increased gloss.

The exact protocol used will vary with the particular parameters of the desired product, including the type of polymer used, the desired blow-up ratio, the thickness of the desired film and the rate of extrusion from the die. For example, to produce a tubular film at a high blow-up ratio (e.g. 5.0) with polypropylene grades having relatively high MFR (2 to 7 g/10 min) and having a low melt strength, a bubble is first created at a low extruder rate with minimal air inside the bubble. Additional air is introduced into the bubble until the bubble becomes unstable, then the extruder rate is increased a nominal amount. This process is repeated in an stepwise manner until the desired blow-up ratio is achieved.

It is believed that the haze associated with polymeric films may be caused by the large crystal size and the consequent rough surface of the film. A higher rate of cooling at the crystallization temperature may result in a reduction of the crystal size. Application of a cooling gaseous medium in a direction substantially parallel to the film's surface will displace the boundary layer of gaseous medium dispensed at the first air ring 19 by a colder boundary layer dispensed by the second air ring 22. Positioning of the second air ring at approximately the point of maximal expansion 18A of the tubular film 14, or the frost line 18, should result in an increased rate of cooling just prior to crystallization. A higher rate of cooling precisely at the temperature (or point) of crystallization may be responsible for the formation of smaller crystal sizes.

A slight but abrupt stretching or expanding of the bubble just at the time of crystallization may cause breaking up or reorientation of forming crystals which may also cause the formation of small crystalline domains and the smoothing of a film's surface.

Chemical additives enhance the clarity of a film by aiding in the formation of many points of crystallization, and thereby contributing to the formation of smaller crystals.

The present invention may be used to produce films from various polymers, preferably crystallizable linear polymers, including polypropylene, polyvinyl chloride, and the like linear polymers. More preferred are high density polyethylene, polypropylene and linear low density polyethylene (LLDPE). The method of this invention is not effective for producing great enhancements in the clarity of high pressure low density polyethylene films.

Films may be produced from the present invention which have a thickness varying from approximately 0.5 to approximately 5.0 mil, and having a blow-up ratio in the range of approximately 1.0 to 10. The gaseous medium provided to the tubular film by the first and second air rings is preferably cooled gas, and more preferably cooled air. The gaseous medium may be provided from a common source and at a common temperature, or it may be from separate sources and at differing temperatures. The temperature of the gaseous medium provided to the bubble by the first and second air rings may vary from approximately 0° C. to approximately 30° C. (30° F. to 70° F.).

Chemical additives may be mixed with the thermoplastic resin to further increase the clarity of the resulting film. These chemical additives are sometimes referred to as "nucleating agents". Examples of nucleating agents include sodium benzoate and di(p-tolylidene)sorbitol (C.A.S. 54686-97-4).

In general, a nucleating agent is added to a polymeric resin prior to the film forming process. An acid neutralizing agent may also be added to neutralize catalyst acid residues. Without an acid neutralizing agent, some nucleating agents decompose and are less effective, particularly in LLDPE resins. For use with the nucleating agent di-(p-tolylidene)sorbitol the recommended neutralizing agent is sodium stearate. Calcium stearate has been found in some cases to be a superior neutralizing agent to sodium stearate.

Many different chemical compounds may fulfill the function of nucleating agents in the performance of the present invention, that is, augmenting the formation of a higher number of points of initial crystallization of the resin.

For some polymers, nucleating agents used in performing the present invention have produced films having greatly enhanced optical properties. It is known, for example, that high density polyethylene does not produce a clear film in a conventional blown film process. However, it has been demonstrated that in performing the present invention, certain high density polyethylene films can be produced with extremely low levels of haze.

EXAMPLES

The invention is illustrated by way of the following examples.

EXAMPLE 1

Production of Linear Low Density Polyethylene Film

Linear low density polyethylene of 1.0 melt index and comprised of the additive formulation shown in Table 1 was processed in a Sano Blown Film Coextrusion Line having a 3½" extruder screw, a 10" die with a 100 mil die gap, following the conditions shown in Table 2.

TABLE 1

| Additive | Concentration (Parts per million by Weight) |
| --- | --- |
| Slip | 1000 |
| Antiblock | 500 |
| Calcium Stearate | 1000 |
| PEPQ | 500 |
| Milladd 3940 | 2000 |
| Irganox 1076 | 200 |

TABLE 2

|  | Roll # | |
| --- | --- | --- |
|  | 1 | 2 |
| Thickness (mils) | 1.0 | 3.0 |
| Melt Temp. (°F.) | 432 | 433 |
| Line Speed (FPM) | 92 | 29 |
| Lay-flat width (in) | 31.5 | 31.0 |
| Output (#/hr) | 200 | 200 |
| Position 2d ring (in. from 1st ring) | 7.0 | 8.75 |
| Temp. 1st ring (°F.) | 59 | 59 |
| Temp. 2nd ring (°F.) | 53 | 52 |
| IBC Damper Opening | 36 | 36 |

The films produced by the above described method were subjected to analysis of their optical characteristics. The haze of each film was determined by the American Society for Testing Material (ASTM) method D-1003-61, Procedure A. Gloss was determined by ASTM d-2457-70, and ASTM D-523-80, Both haze and gloss measurements were made on a PG 500 Photometric Unit (Gardner Laboratory, Inc., Bethesda, Md.). The results of these tests are shown in Table 3.

TABLE 3

|  | Roll # | |
| --- | --- | --- |
|  | 1 | 2 |
| Thickness (mils) | 1.0 | 3.0 |
| Haze (%) | 2.4 | 5.4 |
| Gloss (%) | 87 | 82 |
| Reblock (g @ 24 hr.) | 149.4 | 161.2 |

These results indicate that the method of the present invention produced LLDPE films of 1 mil thickness having reduced haze (2.4 as compared with the normal 8 to 12%) and increased gloss (87% as compared with the normal 40 to 45%). LLDPE films of 3 mil thickness were produced having reduced haze (5.4% as compared with the normal 20%-25%) and increased gloss (82%). The films produced according to the method of the present invention also had a slightly increased tack when no antiblock was present. (Reblock force required is decreased to approximately 155 grams from the normal of approximately 195 grams.) Additional film properties including tear, elongation, tensile, and impact were not significantly altered from those observed in the absence of the present invention.

EXAMPLE 2

Production of Linear Low Density Polyethylene Film

Linear low density polyethylene containing only 200 ppm of an antioxidant (Irganox 1076) was processed in an Egan Film Line having a 1.5" extruder, a 3" die with a 100 mil die gap, following the conditions shown in Table 4. No nucleating agents were added to the resin.

TABLE 4

|  | Roll # | | | | | | |
| --- | --- | --- | --- | --- | --- | --- | --- |
|  | 1* | 2 | 3 | 4* | 5 | 6 | 7 |
| Position 2d ring (inches from 1st ring) | 0 | 3.25 | 3.25 | 0 | 3.25 | 3.25 | 5 |
| Temp. of Melt (°F.) | 365 | 365 | 365 | 365 | 365 | 365 | 365 |
| Temp. of 1st ring (°F.) | 40 | 42 | 42 | 45 | 45 | 45 | 45 |
| Temp. of 2nd ring (°F.) | — | 40 | 40 | — | 36 | 36 | 34 |
| Screw Speed (RPM) | 62 | 62 | 62 | 63 | 63 | 63 | 62 |
| Extruder Output (#/hr) | 29 | 29 | 29 | 29 | 29 | 29 | 29 |
| Frost Line height (in) | 3.5 | 3.5 | 3.5 | 3.5 | 3.5 | 3.5 | 3.5 |
| Lay-flat width (in) | 9 | 9.5 | 9.5 | 9 | 9 | 9 | 9 |
| Thickness (mils) | 1.0 | 1.0 | 1.0 | 1.0 | 1.0 | 1.0 | 1.0 |

*Second air ring was not used

The films produced by the above described method were subjected to analysis of their optical characteristics. The haze of each film was determined by the Americal Society for Testing Material (ASTM) method D-1003-61, Procedure A. Gloss was determined by ASTM d-2457-70 and ASTM D-523-80. Both haze and gloss measurements were made on a PG 5500 Photometric Unit (Gardner Laboratory, Inc., Bethesda, Md.). Reblock, TE Impact, and TEAR analysis was made according to standard ASTM methods. The results of these tests are shown in Table 5.

TABLE 5

|  | Roll # | | | | | | |
| --- | --- | --- | --- | --- | --- | --- | --- |
|  | 1* | 2 | 3 | 4* | 5 | 6 | 7 |
| Haze (%) | 8.6 | 3.5 | 2.4 | 10.4 | 2.2 | 2.5 | 3.0 |
| Gloss (%) Reblock (grams) | 56.9 | 81.2 | 84.8 | 49.5 | 88.3 | 82.3 | 82.6 |
| TE/Impact | 1.432 | 1.161 | 1.627 | 1.332 | 2.437 | 1.986 | 0.947 |
| Tensile MD (psi) | 7478 | 7448 | 7526 | 7662 | 7570 | 8046 | 7316 |
| Tensile TD (psi) | 5303 | 5309 | 5245 | 5221 | 4960 | 4893 | 5043 |
| Elongation MD (%) | 10.1 | 9.2 | 8.7 | 8.9 | 9.2 | 9.9 | 9.9 |
| Yield Strength TD (%) | 9.2 | 9.2 | 9.7 | 9.3 | 9.1 | 8.9 | 9.9 |
| TEAR MD (grams) | 77 | 129 | 129 | 93 | 102 | 103 | 108 |

TABLE 5-continued

| | Roll # | | | | | | |
|---|---|---|---|---|---|---|---|
| | 1* | 2 | 3 | 4* | 5 | 6 | 7 |
| TEAR TD (grams) | 422 | 570 | 389 | 517 | 457 | 340 | 356 |

*Second air ring was not used

These results indicate that the method of the present invention produced LLDPE films of 1 mil thickness having reduced haze (2.2 to 3.5% as compared with the controls 8.6 and 10.4%) and increased gloss (at least 80% as compared with the controls 49.9 and 56.9%) The films produced according to the method of the present invention also had a slightly increased tack when no antiblock was present. (Reblock force required is decreased to approximately 155 grams from the normal of approximately 195 grams). As shown in Table 5, additional film properties including tear, elongation, tensile, and impact were not significantly altered by the use of the present invention.

EXAMPLE 3

Production of Polypropylene Films by the Blown Tube Method of the Present Invention and Comparison with Conventional Methods Polypropylene films were produced in a SANO Blown Film Coextrusion line according to the parameters set out in Table 6. These films were made from polypropylene polymers characterized as shown in Table 7. These films made using the present invention were compared with films made using a Tenter Frame Bioriented Film Line (TFBFL) method and to films made using a conventional slot die cast method (SDC). The resultant films were analyzed for optical characteristics and strength parameters as described for Examples 1 and 2. The films were also analyzed for shrinkage using a hot air gun. The resultant data are shown in Table 8.

TABLE 6

| | Roll # | | | | |
|---|---|---|---|---|---|
| | 1 | 2 | 3 | 4 | 5 |
| Die (in) | 10 | 10 | 6 | 6 | 6 |
| Die Gap (mil) | 100 | 40 | 30 | 30 | 30 |
| Diam. 1st ring (in) | 10 | 10 | 6 | 6 | 6 |
| Lay Flat Width (in) | 31 | 31 | 45 | 44 | 37 |
| BUR | 2 | 2 | 4.7 | 4.7 | 4.0 |
| Thickness (mil) | 1.0 | 1.0 | 1.3 | 1.6 | 1.2 |
| Melt Temp. (°F.) | 425–430 | 432 | 450 | 407 | 458 |
| Extruder head Pressure (psi) | 1340 | 2060 | 2000 | 1650 | 1750 |
| Extruder speed (RPM) | 26 | 50 | 61 | 56 | 62 |
| Air Temp. 1st ring (°F.) | 61 | 57 | 63 | 63 | 63 |
| Air Temp. 2nd ring (°F.) | 52 | 49 | 63 | 63 | 59 |
| Distance between rings (in) | 5.25 | 7.5 | 10.66 | 10.5 | 11.75 |
| Thruput (#/hr) | 144 | 180 | 168 | 160 | 180 |
| Line Speed (FPM) | 40 | 60 | 60 | 51 | 60 |

TABLE 7

| | Roll # | | | | |
|---|---|---|---|---|---|
| | 1 | 2 | 3 | 4 | 5 |
| *Polypropylene type | a | a | b | b | a |
| Antiblock (Syloid 244) (ppm) | 0 | 0 | 1100 | 1100 | 0 |
| Slip Agent (Eurcylamide) (ppm) | 0 | 0 | 1100 | 1100 | 0 |
| Melt Flow Rate (g/10 minutes) | 2.0 | 2.0 | 2.0 | 7.0 | 2.0 |
| Calcium Stearate (ppm) | 500 | 500 | 800 | 800 | 500 |
| BHT (Butylated hydroxytoluene) (ppm) | 550 | 550 | 550 | 550 | 550 |
| Irganox 1010 (ppm) | 1000 | 1000 | 1000 | 1000 | 1000 |
| Milladd 3940 (ppm) | 2000 | 2000 | 2500 | 2500 | 2500 |

*Note:
a Homopolymer
b Copolymer: Approximately 2.7% by weight ethylene incorporated into polymer

TABLE 8

| | Roll # | | | | | TFBF* | SCD* |
|---|---|---|---|---|---|---|---|
| | 1 | 2 | 3 | 4 | 5 | | |
| Haze (%) | 1.2 | 5.2 | 6.2 | 4.6 | 6.1 | 1.2 | 1.7 |
| Gloss (%) | 92 | 71 | 65 | 68 | 65 | 97 | 85 |
| Tensile ULT (psi) | | | | | | | |
| MD | 9916 | 10487 | 7741 | 6703 | 6473 | 33891 | 8900 |
| TD | 5578 | 5616 | 7015 | 4912 | 5589 | 18192 | 6700 |

TABLE 8-continued

|  | Roll # | | | | | TFBF* | SCD* |
| --- | --- | --- | --- | --- | --- | --- | --- |
|  | 1 | 2 | 3 | 4 | 5 | | |
| Elongation ULT | | | | | | | |
| MD (%) | 784 | 793 | 603 | 689 | 434 | 65 | 600 |
| TD (%) | 12 | 10 | 492 | 467 | 240 | 148 | 700 |
| Shrinkage | | | | | | | |
| MD (%) | 76 | 75 | 53 | 32 | 60 | 7.0 | — |
| TD (%) | −23 | −17 | 10.3 | 12.7 | 8.0 | 3.0 | — |
| Elemendurf Tear (g) | | | | | | | |
| MD | 4 | 5 | 6 | 11 | 4 | 4 | — |
| TD | 30 | 29 | 6 | 15 | 16 | 9 | — |

These results indicated that it is possible to prepare polypropylene films by the method of the present invention. These films exhibited substantially less haze with improved gloss characteristics. At a 2:1 blow up ratio, polypropylene films produced were anisotropic in tensile and elongation characteristics with negative TD shrinkage. At a 5:1 blow up ratio, polypropylene films produced were balanced in tensile and elongation with positive TD shrinkage.

Many modifications and alterations to these embodiments will be apparent to those skilled in the art in view of this disclosure. It is, therefore, intended that all such equivalent modifications and variations fall within the spirit and scope of the present invention as claimed.

We claim:

1. A method for producing a polymeric film comprising the steps of:
   heating an extrudable, crystallizable, film-forming thermoplastic resinous material containing a nucleating agent to a molten condition;
   extruding the heated resinous material through an annular die to form a tubular film;
   injecting a gas to the interior of the tubular film to expand the tubular film substantially normal to its longitudinal axis to a maximum expansion and to maintain a positive gas pressure within said tubular film;
   delivering a first stream of gaseous medium substantially parallel to the longitudinal axis of the tubular film to cool the tubular film at the point of its extrusion from the die, and diverting said first stream away from said film upstream of the point of maximum expansion of said film;
   adjusting the temperature and/or flow rate of said first gaseous stream to adjust the location of the point of crystallization, or the frost line, of said film to correspond to its point of maximum expansion;
   delivering a second stream of gaseous medium substantially parallel to the longitudinal axis of the tubular film to contact and cool the tubular film no further upstream than at the downstream point of its maximal expansion; and
   recovering a polymeric film having significantly enhanced optical characteristics.

2. The method of claim 1 wherein said first stream of gaseous medium is permitted to exit from along the longitudinal axis of the tubular film prior to the delivering of said second stream of gaseous medium.

3. The method of claim 1 wherein said linear polymer is linear polyethylene.

4. The method of claim 3 wherein said linear polyethylene is linear low density polyethylene.

5. The method of claim 3 wherein said linear polyethylene is linear high density polyethylene.

6. The method of claim 1 wherein said linear polymer is linear polypropylene.

7. The method of claim 1 wherein said linear polymer is polyvinyl chloride.

8. An apparatus for producing a polymeric film, comprising:
   an annular die;
   means for introducing a crystallizable, film-forming, thermoplastic resinous material containing a nucleating agent into said die for extrusion through said die to generate a tubular film;
   means for maintaining a positive gas pressure in the interior of said tubular film to expand said film in a direction generally normal to the longitudinal axis of said tubular film;
   a first air ring positioned about said tubular film proximate to and coaxial with said die and said tubular film for delivering a first stream of cooling gaseous medium to the exterior of said film;
   a second air ring spaced downstream from said first air ring and positioned about said tubular film coaxial with said die and said first air ring and positioned to deliver a second stream of cooling gaseous medium to the exterior of said tubular film at approximately the point of its maximal expansion;
   said second air ring comprising a base member having a top and a bottom, and having a first annular chamber adapted to receive a gaseous medium; a sleeve having a top and a bottom, an outside surface and an inside surface, wherein said inside surface is proximate to the outside surface of the tubular film; a collar having an inside surface and an outside surface, attached to the outside surface of said sleeve and adjustably supporting said sleeve about said base member; a second annular chamber formed by the outside surface of said sleeve, the inside surface of said collar and the top of said base member, said base member having a plurality of ports adapted to promote gaseous communication between said first annular chamber and said second annular chamber; and an annular disc mounted on the bottom of said base member, said annular disc comprising a horizontal plate having a vertical lip which projects upwardly from a central opening in said plate toward said sleeve and defines an adjustable open annulus between said lip and said sleeve extending parallel to the direction of extrusion of said film, said annulus forming the only outlet for said second gaseous medium.

9. The apparatus of claim 8 wherein the outside surface of said sleeve of said second air ring is threadably engaged with said collar to provide for adjustment of the size of said open annuls.

* * * * *